United States Patent
Lim

(10) Patent No.: US 12,157,413 B2
(45) Date of Patent: Dec. 3, 2024

(54) METHOD OF REDUNDANTLY PROTECTING DRIVER IN VEHICLE AND APPARATUS THEREFOR

(71) Applicant: HYUNDAI MOBIS CO., LTD., Seoul (KR)

(72) Inventor: Dae Sik Lim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 92 days.

(21) Appl. No.: 17/945,392

(22) Filed: Sep. 15, 2022

(65) Prior Publication Data

US 2023/0124231 A1 Apr. 20, 2023

(30) Foreign Application Priority Data

Oct. 19, 2021 (KR) .................. 10-2021-0139688

(51) Int. Cl.
  *B60Q 1/52* (2006.01)
  *B60Q 1/26* (2006.01)
  *B60W 40/13* (2012.01)

(52) U.S. Cl.
  CPC ............ *B60Q 1/52* (2013.01); *B60Q 1/2696* (2013.01); *B60W 40/13* (2013.01); *B60W 2556/50* (2020.02)

(58) Field of Classification Search
  None
  See application file for complete search history.

(56) References Cited

U.S. PATENT DOCUMENTS

| | | | | |
|---|---|---|---|---|
| 10,889,235 B2* | 1/2021 | Sassoon | .................. | F21S 43/19 |
| 11,967,106 B2* | 4/2024 | Galoogahi | ................ | G06T 7/20 |
| 2006/0181432 A1* | 8/2006 | Monteith | ................. | B60Q 7/00 340/907 |
| 2012/0268960 A1* | 10/2012 | Kiser | ....................... | B60Q 1/22 362/485 |
| 2017/0217361 A1* | 8/2017 | Miller | ..................... | H05B 47/11 |
| 2017/0361768 A1* | 12/2017 | Kim | ....................... | B60Q 1/545 |
| 2018/0086253 A1* | 3/2018 | Bratcher | .................. | B60Q 1/32 |
| 2019/0135291 A1* | 5/2019 | Sim | ......................... | A61B 5/165 |
| 2019/0248273 A1* | 8/2019 | Sassoon | .................. | B60Q 1/22 |
| 2020/0078260 A1* | 3/2020 | Choudhury | ............ | A61H 19/34 |
| 2020/0265718 A1* | 8/2020 | Watanabe | .............. | G01B 11/24 |
| 2020/0309338 A1* | 10/2020 | Singh | ........................ | B60Q 1/30 |
| 2020/0355823 A1* | 11/2020 | Tingley | ................. | G01S 13/931 |
| 2021/0362661 A1* | 11/2021 | Gorgees | .................. | B60R 11/04 |
| 2021/0407297 A1* | 12/2021 | Kim | ......................... | G01S 7/003 |
| 2022/0410922 A1* | 12/2022 | Koh | ....................... | B60W 50/16 |

FOREIGN PATENT DOCUMENTS

| | | | | | |
|---|---|---|---|---|---|
| CA | 3135623 A1 | * | 10/2020 | .......... | B60Q 1/0088 |
| CN | 107139832 A | * | 9/2017 | ............... | B60Q 9/00 |
| CN | 107776540 A | * | 3/2018 | | |
| JP | 4118743 B2 | * | 7/2008 | | |
| KR | 102241148 B1 | * | 4/2021 | | |
| WO | WO-2016103467 A1 | * | 6/2016 | | |

\* cited by examiner

*Primary Examiner* — Fekadeselassie Girma

(74) *Attorney, Agent, or Firm* — NSIP Law

(57) ABSTRACT

A method of controlling a vehicle to redundantly protect a driver, includes determining whether the vehicle has entered a shoulder of a road based on a Global Positioning System (GPS) information; and based on a result of the determining, controlling a Light Emitting Diode (LED) projector based on a first internal information of the vehicle, and transmitting a second internal information different from the first internal information to a server.

20 Claims, 7 Drawing Sheets

FIG. 3
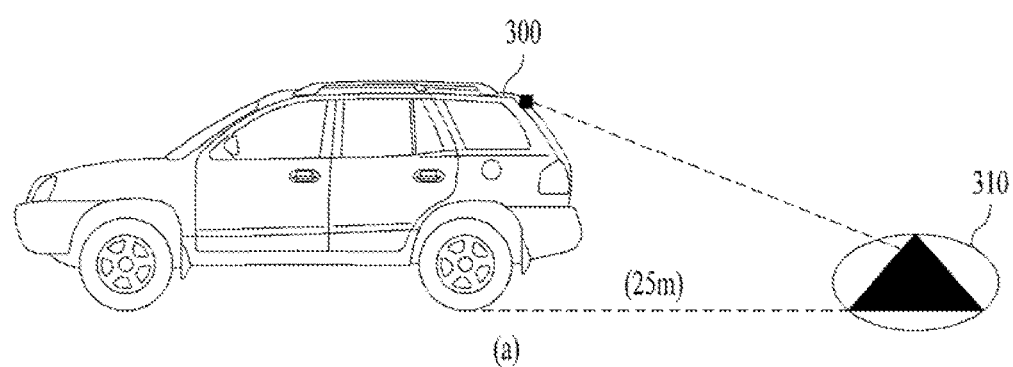
(a)
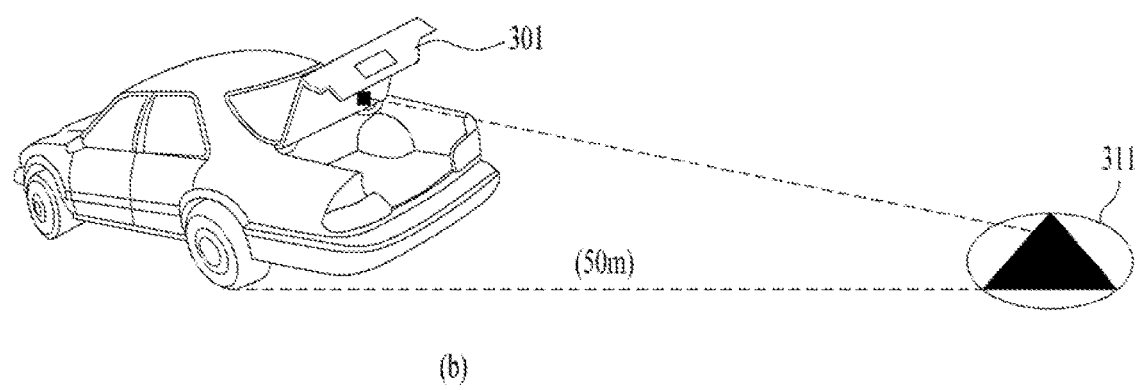
(b)

METHOD OF REDUNDANTLY PROTECTING DRIVER IN VEHICLE AND APPARATUS THEREFOR

CROSS-REFERENCE TO RELATED APPLICATIONS

This application claims the benefit under 35 U.S.C. § 119(a) of Korean Application No. 10-2021-0139688, filed on Oct. 19, 2021 in the Korean Intellectual Property Office, the entire disclosure of which is incorporated herein by reference for all purposes.

BACKGROUND

Field of the Disclosure

The following description relates to a method of redundantly protecting a driver in vehicle and apparatus therefor.

Discussion of the Related Art

The risk of major accidents caused by highway shoulder parking is increasing. A triangle must be installed when parking on the shoulder, but in reality, not many people install it themselves despite the dangerous situation.

Prior to Jun. 2, 2017, drivers were required to install a triangle at a distance of 100 meters from an accident vehicle during the day, and at night, a triangle at a distance of 200 meters from an accident vehicle.

However, the enforcement regulations of the Road Traffic Act were revised when a bigger problem caused by a secondary accident occurred while trying to install a triangle after parking on the shoulder.

According to Article 40 (3) of the Enforcement Rule of the Road Traffic Act, revised as of Jun. 2, 2017, "a warning triangle, etc. shall be installed at a location that can be confirmed by a driver of a car approaching from the rear."

On the other hand, if a vehicle is parked on the shoulder, various problems may occur in a driver's condition, ae vehicle's condition, etc. In this case, it is dangerous for a driver to directly install a warning triangle and make a rescue request, and there was a problem that time was spent in urgent situations where every minute and second were important.

Lastly, most of the rescue request systems of the related art are limited to preset police stations, fire stations, and hospitals, and thus there is a problem that it takes a lot of time to arrive at an accident site.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of controlling a vehicle to redundantly protect a driver, includes determining whether the vehicle has entered a shoulder of a road based on a Global Positioning System (GPS) information; and based on a result of the determining, controlling a Light Emitting Diode (LED) projector based on a first internal information of the vehicle, and transmitting a second internal information different from the first internal information to a server.

The result of the determining may be that the vehicle entered the shoulder.

The determining may further include estimating that the vehicle has entered the shoulder when a location GPS information of the GPS information is within an error range of a preset shoulder GPS information of the GPS information.

The determining may further include estimating, when the location GPS information is out of the error range of the preset shoulder GPS information, that the vehicle has entered the shoulder when the vehicle is located on a highway and a stoppage/parking time is continuously equal to or greater than at least 3 seconds.

The controlling may further include activating, when a first condition is satisfied, a first LED projector installed outside a rear surface of the vehicle.

The controlling may further include calculating, when a second condition is satisfied, a weight of an object loaded in a trunk of the vehicle using a weight detection sensor.

The controlling may further include opening the trunk of the vehicle when the calculated weight of the object is zero, and activating a second LED projector installed inside the vehicle.

The method may further include receiving, when the second internal information corresponds to a first category, a unique identification information on an emergency vehicle from the server; and controlling at least one door of the vehicle to be in an openable state when the unique identification information is recognized within a preset distance.

The method may further include receiving from the server, when the second internal information corresponds to a second category, a map information on a hospital within a preset distance from the vehicle; and displaying the received map information.

When the second internal information corresponds to a third category, the second internal information may include a Diagnostic Trouble Code (DTC).

In another general aspect, a non-transitory computer-readable storage medium store instructions that, when executed by a processor, configure the processor to store: a first command for determining whether a vehicle has entered a shoulder of a road based on a Global Positioning System (GPS) information; a second command for controlling, when the vehicle is determined as having entered the shoulder, a Light Emitting Diode (LED) projector based on a first internal information of the vehicle; and a third command for transmitting, when the vehicle is determined as having entered the shoulder, a second internal information different from the first internal information to a server.

In another general aspect, a vehicle redundantly protecting a driver includes a controller configured to determine whether the vehicle has entered a shoulder of a road based on a Global Positioning System (GPS) information, a Light Emitting Diode (LED) projector configured to respond to a first internal information of the vehicle based on a result of the determination, and a communication module configured to transmit a second internal information, different from the first internal information, to a server based on the result of the determination.

The controller may be further configured to estimate that the vehicle has entered the shoulder when a location GPS information of the GPS information is within an error range with a preset shoulder GPS information of the GPS information.

The controller may be further configured to estimate, when the location GPS information is out of the error range with the preset shoulder GPS information, that the vehicle has entered the shoulder when the vehicle is located on a highway and a stoppage/parking time is continuously equal to or greater than at least 3 seconds.

The controller may be further configured to activate, when a first condition is satisfied, a first LED projector installed outside a rear surface of the vehicle.

The controller may be further configured to calculate, when a second condition is satisfied, a weight of an object loaded in a trunk of the vehicle using a weight detection sensor.

When the calculated weight of the object is zero, the controller may be further configured to open the trunk of the vehicle and activate a second LED projector installed inside the vehicle.

When the second internal information corresponds to a first category, the communication module may be further configured to receive a unique identification information on an emergency vehicle from the server, and control a door of the vehicle to be in an openable state when the unique identification information on the emergency vehicle is recognized within a preset distance.

When the second internal information corresponds to a second category, the communication module may be further configured to receive a map information on a hospital within a preset distance of the vehicle from the server, and control a display module to display the received map information.

The result of the determination may be that the vehicle entered the shoulder.

Other features and aspects will be apparent from the following detailed description, the drawings, and the claims.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. The above and other aspects, features, and advantages of the present disclosure will become more apparent upon consideration of the following description of preferred embodiments, taken in conjunction with the accompanying drawing figures. In the drawings:

FIG. 3 illustrates embodiments of varying a plurality of LED projectors depending on situations;

DETAILED DESCRIPTION

Figure 1:
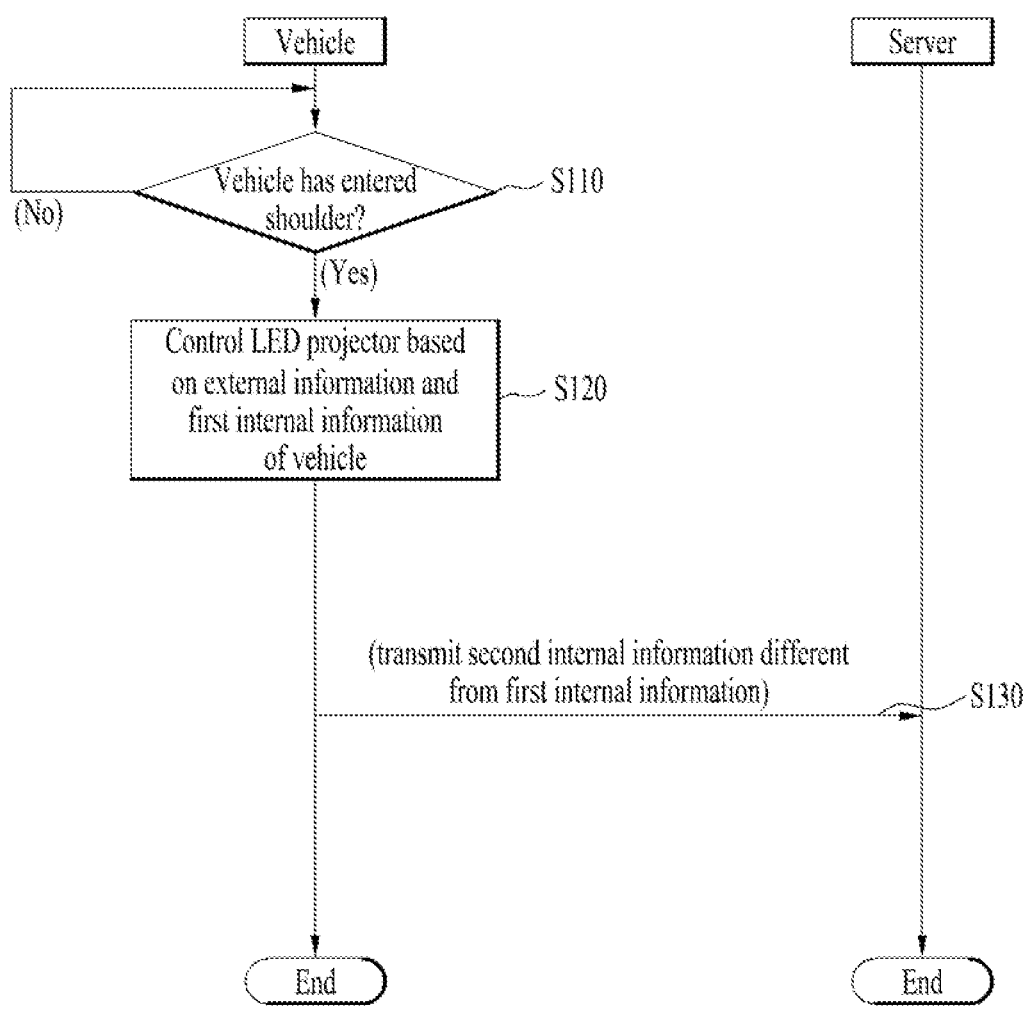
FIG. 1 is a flowchart illustrating a flow of data transceived by a vehicle with a server to redundantly protect a driver according to one of embodiments of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

One object of the present disclosure is to provide a solution for preventing an external secondary accident of a vehicle parked on a shoulder in advance and quickly protecting a driver after detecting an internal state of the driver.

Another object of the present disclosure is to provide a system capable of accurately detecting whether a vehicle is parked/stopped on a shoulder and automatically changing a position of a virtual warning triangle based on various external environment informations and the like.

Further object of the present disclosure is to provide a system capable of classifying a state of a vehicle stopped/parked on a shoulder, a driver state of the vehicle and the like into a plurality of categories and enabling rescue measures according to a priority.

FIG. 1 is a flowchart illustrating a flow of data transceived by a vehicle with a server to redundantly protect a driver according to one of embodiments of the present disclosure.

First, as a premise for implementing the present disclosure, it is determined whether a vehicle has entered a shoulder based on Global Positioning System (GPS) information [S110]. A further detailed embodiment for implementing the step S110 will be described below in detail with reference to FIG. 2 (a).

As a result of the determination [S110], when it is determined that the vehicle has entered the shoulder, the vehicle according to one embodiment of the present disclosure controls at least one Light Emitting Diode (LED) projector based on an external information and a first internal information of the vehicle [S120]. A further detailed embodiment for implementing the step S120 will be described below in detail with reference to FIG. 2 (b) and FIG. 3.

As a result of the determination [S110], when it is determined that the vehicle has entered the shoulder, the vehicle according to one embodiment of the present disclosure transmits a second internal information different from the first internal information to a server [S130]. A specific protocol for transceiving data between the vehicle according to one embodiment of the present disclosure and the server will be described in detail with reference to FIGS. 4 to 6.

Figure 2:
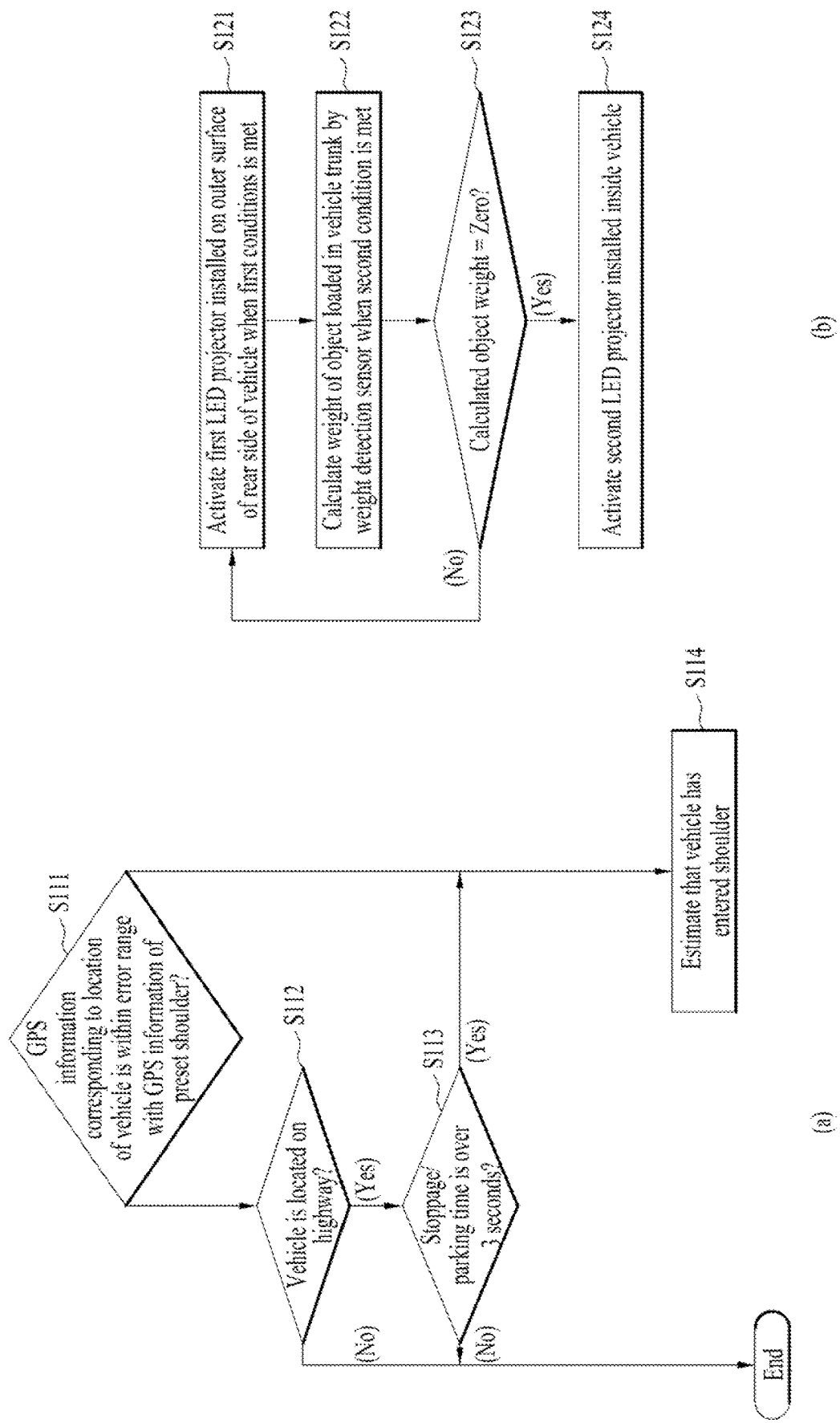
FIG. 2 (a) is a flowchart illustrating the step S110 shown in FIG. 1 in detail and FIG. 2 (b) is a flowchart illustrating the step S120 shown in FIG. 1 in detail.

FIG. 2 (a) is a flowchart illustrating the step S110 shown in FIG. 1 in detail and FIG. 2 (b) is a flowchart illustrating the step S120 shown in FIG. 1 in detail.

First, a method of more accurately detecting whether a vehicle according to one embodiment of the present disclosure has been stopped/parked on a shoulder of a highway will be described with reference to FIG. 2(a).

The vehicle according to one embodiment of the present disclosure determines whether a GPS information corresponding to a location of the vehicle is within an error range with a preset GPS information of the shoulder [S111].

As a result of the determination [S111], if the GPS information corresponding to a position of the vehicle is within the error range with the preset GPS information of the shoulder, it is primarily estimated that the vehicle has entered the shoulder [S114].

However, if only the GPS information of the shoulder is relied on, there is a problem that the occurrence of errors due to weather conditions, communication conditions and the like cannot be filtered.

In order to solve this problem, as a result of the determination [S111], when the GPS information corresponding to the location of the vehicle is outside the error range with the GPS information of the preset shoulder, it is determined whether the vehicle is located on the highway [S112].

Furthermore, as a result of the determination [S112], when the stoppage/parking time of the vehicle is, for example, 3 seconds or more, it is secondarily estimated that the vehicle has entered the shoulder [S114]. Of course, it is also within the scope of the present disclosure to set the reference time of the above-described 3 seconds differently according to a traffic congestion situation.

Hereinafter, an embodiment of variably controlling a virtual LED projector according to various situations will be described with reference to FIG. 2 (b), assuming that a vehicle is stopped/parked on a highway shoulder.

A vehicle according to one embodiment of the present disclosure includes at least one LED projector for activating a virtual warning triangle, and further stores data that is a clear reference for driving the LED projector in a memory.

When a first condition stored in the memory is satisfied, the vehicle according to one embodiment of the present disclosure activates a first LED projector installed outside a rear surface [S121]. Through this, a virtual warning triangle may be displayed on the ground at a predetermined distance behind the vehicle. In this regard, the following will be described in more detail with reference to FIG. 3 (a).

Meanwhile, here, the first condition is determined based on various external informations of a vehicle. For example, the external information of the vehicle includes both weather information and time information. In case that the sun has not set based on the current date and time and that weather is not rainy or snowy, it is determined that the first condition is satisfied. In this case, since there is no significant change in a braking distance of another vehicle, it is not necessary to maximize the position where the virtual warning triangle is displayed.

On the other hand, when a second condition stored in the memory is satisfied, a weight of an object loaded in a trunk of the vehicle is calculated by a weight detection sensor [S122].

Meanwhile, here, the second condition is determined based on various external informations of a vehicle. For example, the external information of the vehicle includes both weather information and time information. When the sun sets based on the current date and time, it is determined that the second condition is satisfied irrespective of weather. Furthermore, it is determined that the second condition is satisfied even in the case of rainy or snowy weather, although the sun is not in a sunset state based on the current date and time. In this case, since there may be a considerable change in the braking distance of another vehicle, it is necessary to maximize the position where the virtual warning triangle is displayed.

Yet, when the above-described second condition is satisfied, a second LED projector is not immediately activated, and as shown in a step S122, it is designed that a first internal information (e.g., weight of an object loaded in the trunk of the vehicle) of the vehicle is further checked. In order to activate the second LED projector, the trunk is changed to an open state, which is an embodiment for preventing damage (for example, due to rain or snow) to an object loaded in the trunk of the vehicle.

When the calculated weight of the object (loaded in the vehicle trunk) is zero [S123], the trunk of the vehicle is opened and the second LED projector installed inside the vehicle is activated [S124]. Therefore, there is no need for a separate configuration for changing the angle of the first LED projector, and the second LED projector is installed in the trunk of the vehicle to be protected from rain, snow, or the like during operation, thereby solving problems such as a short circuit and the like.

Through this, the virtual warning triangle may be displayed on the ground at a predetermined distance behind the vehicle. In this regard, the following will be described in more detail with reference to FIG. 3 (b).

FIG. 3 illustrates embodiments of varying a plurality of LED projectors depending on situations;

FIG. 3 (a) assumes that the external information of the vehicle satisfies the above-described first condition.

For example, when the sun does not set based on the current date and time and the weather is not rainy or snowy it is determined that a first condition stored in a memory of a vehicle 300 is satisfied, and a first projector installed on an outer surface of a rear side of the vehicle displays a virtual warning triangle 310 on the ground.

On the other hand, FIG. 3 (b) illustrates an embodiment in which external information of a vehicle not only satisfies the second condition described above, but also additionally considers a first internal information (e.g., weight of an object loaded in a vehicle trunk) of a vehicle.

For example, when the sun has set already based on the current date and time, it is determined that a second condition stored in a memory of a vehicle 301 is satisfied irrespective of weather. Alternatively, it is determined that the second condition stored in the memory of the vehicle 301 is satisfied even when the sun does not set based on the current date and time, but the weather is rainy or snowy.

The LED projector is immediately activated when the first condition is satisfied. Yet, when the second condition is satisfied, the trunk is opened only if there is no object loaded on the vehicle trunk or a weight of a loaded object is equal to or smaller than a preset threshold through a weight detection sensor installed in the vehicle, and the second projector installed in the trunk of the vehicle displays a virtual warning triangle 311 on the ground. The virtual warning triangle 311 illustrated in FIG. 3(b) is displayed farther than the virtual warning triangle 310 illustrated in FIG. 3 (a), and thus a technical effect of reducing a possibility of collision with another vehicle having a longer braking distance is expected.

Figure 4:
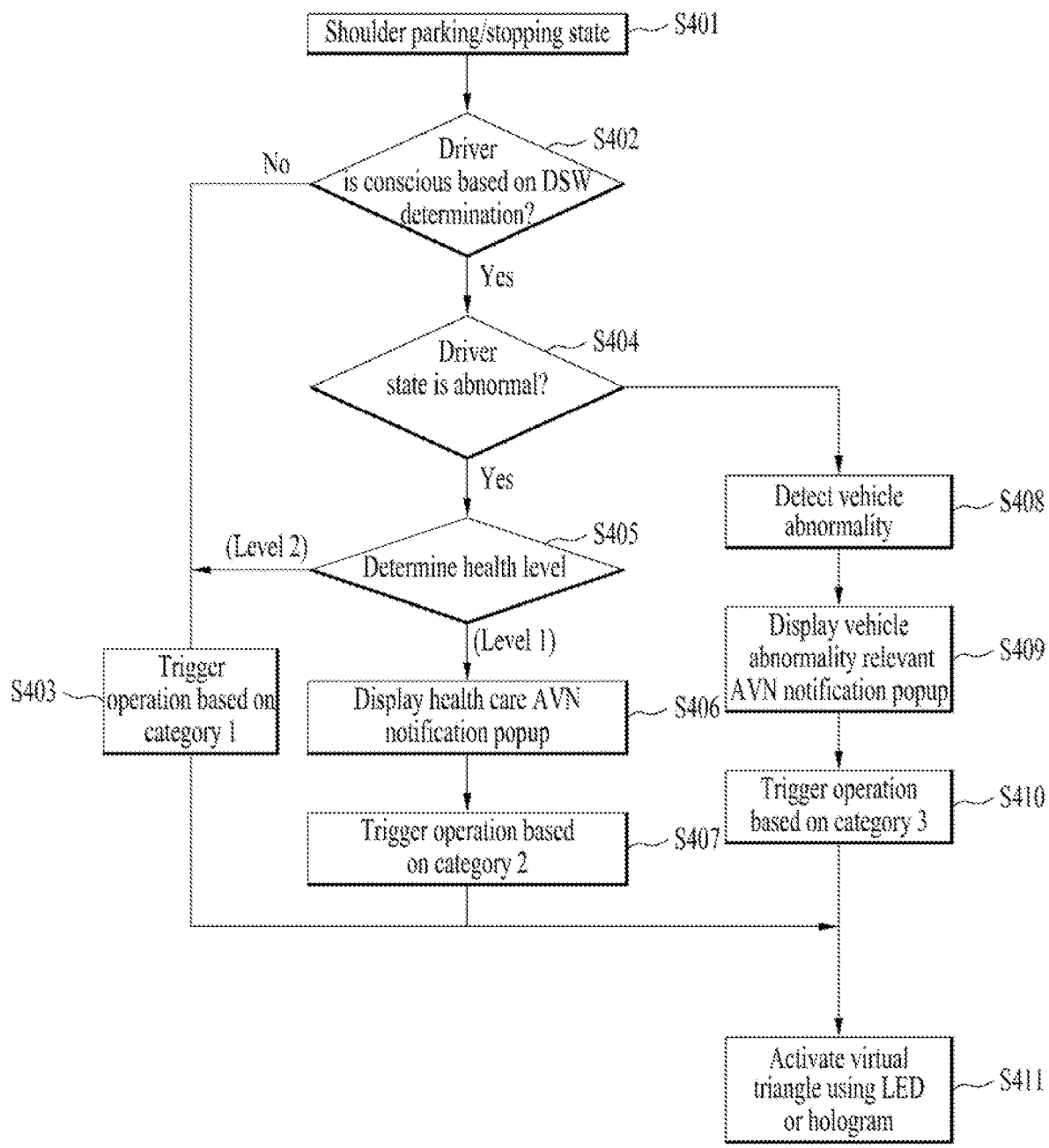
FIG. 4 is a flowchart illustrating a process for classifying states of driver/vehicle and the like into three categories according to one of embodiments of the present disclosure.

FIG. 4 is a flowchart illustrating a process for classifying states of driver/vehicle and the like into three categories according to one of embodiments of the present disclosure;

Embodiments described with reference to FIG. 4 and so on relate to a system that senses internal information of a vehicle to enable a quick rescue depending on states of the corresponding vehicle and driver, whereas previous embodiments mainly relate to technologies of detecting external information of a vehicle to reduce a possibility of collision with another vehicle.

First, assume a state that a vehicle according to one embodiment of the present disclosure is stopped/parked on a shoulder of a highway [S401]. In a specific embodiment for implementing this, as described above in FIG. 2 (a), a redundant description will be omitted.

Furthermore, the vehicle according to one embodiment of the present disclosure determines whether a driver is conscious through a DSW system [S402]. For example, based on a camera attached to the vehicle, if driver's eyes are closed for more than a certain period of time and fail to respond to the sound of a large volume generated at random, the driver is determined to be unconscious.

Here, the Driver State Warning (DSW) system is operated based on, for example, a camera mounted on a top end of a dashboard in front of a driver's seat, a warning device, etc. The count and time of blinking, yawning, eye-closing and the like, which are informations that can be grasped from a driver's face through the camera, may be recognized, and based on this, driver's fatigue and drowsy driving may be determined.

When it is determined that the driver is unconscious as a result of the determination [S402], the vehicle according to one embodiment of the present disclosure starts an operation based on category 1 [S403]. And, like other categories, a virtual triangle using at least one LED projector is activated [S411].

That is, the operation based on category 1 corresponds to a case that a second internal information (e.g., a driver's state) corresponds to the category 1 (unconsciousness) by the operation of the DSW system. Here, the second internal information and the like may be transmitted from the vehicle to a server.

Although not shown in FIG. 4, the vehicle according to one embodiment of the present disclosure receives unique identification information on an emergency vehicle from the server and controls at least one door of the vehicle to be opened only when the unique identification information on the emergency vehicle is recognized within a preset distance. Accordingly, in the category 1 state, there is a technical effect of preventing a secondary accident from occurring due to an intrusion by an unauthorized person.

As a result of the determination [S402], when it is determined that the driver is conscious, it is determined whether there is no problem with a health state of the driver [S404]. For example, the health state of the driver is monitored through a separate wearable device worn by the driver or a sensor attached to a handle or seat. In this case, body temperature, heart rate, pulse, blood pressure, Electro-EncephaloGraphy (EEG), and Heart Rate Variability (HRV) and the like of the driver may be checked.

As a result of determining a driver's health level through the above-described wearable device or separate sensor [S405], the vehicle operation based on the above-described category 1 is designed to be triggered when the result corresponds to a level 2 (e.g., 50% out of a normal body temperature range) [S403].

On the contrary, as a result of determining the driver's health level through the above-described wearable device or separate sensor [S405], when the result corresponds to level 1 (e.g., 10 to 50% in the normal body temperature range), a health notification popup is displayed on an AVN (Audio, Video, Navigation) mounted on the vehicle [S406]. Meanwhile, in the step S406, a first option for additionally selecting a presence or absence of an accident, a second option for enabling a telephone connection to a health center, and a third option for checking a current situation and inputting a comment may be displayed additionally.

Subsequently, the vehicle according to one embodiment of the present disclosure triggers an operation based on category 2 [S407] and, like other categories, activates a virtual triangle using at least one LED projector [S411].

Here, the operation based on category 2 corresponds to a case that a second internal information (e.g., a driver's state) corresponds to the category 2 (when the driver is conscious and in a health abnormality state enough to drive a vehicle) according to the operation of the DSW system. Here, the second internal information and the like may be transmitted from the vehicle to the server.

In this case, the vehicle according to one embodiment of the present disclosure receives map information on a hospital, which is located within a preset distance from the vehicle, from the server, and displays the received map information.

When there is no problem with the driver's state as a result of the determination [S404], the vehicle according to one embodiment of the present disclosure detects an abnormality of the vehicle [S408] and displays a notification popup related to the vehicle abnormality on the AVN (Audio, Video, Navigation) mounted on the vehicle [S409]. Meanwhile, in the step S409, a first option for selecting a presence or absence of an accident and a second option for checking a current situation and inputting a comment may be displayed additionally.

In addition, the vehicle according to one embodiment of the present disclosure triggers an operation based on category 3 [S410] and, like other categories, activates a virtual triangle using at least one LED projector [S411].

Here, the operation based on the category 3 means that the vehicle transmits a Diagnostic Trouble Code (DTC) recognized as the second internal information to the server.

In summary, when the vehicle according to one embodiment of the present disclosure detects the category 1 (e.g., a state in which a driver is unconscious, a state in which driver's health is very critical despite being conscious, etc.), a request information delivery system for rescuing the driver is automatically triggered. For example, the emergency situation of the driver is forwarded to the highway center, 112, 119, a wrecker, an insurance company, a short-distance vehicle, etc.

On the other hand, if the vehicle detects the category 2 (e.g., a state in which a drive is conscious and in which there is only a simple abnormality to the driver's health), an automatic call connection is made to the health center and a guardian phone.

Finally, if the vehicle detects the category 3 (e.g., vehicle abnormality), the vehicle sends relevant information to vehicles in short distance, which need to receive parking/stoppage related notification. If the vehicle has a simple abnormality, it sends the relevant information to a wrecker and an insurance company. When a vehicle accident occurs, the vehicle sends relevant information to the police station and the highway center.

Information including a vehicle location, a situation image around the vehicle, and a 3D view is transmitted to the server and the like in common to the categories 1, 2, and 3.

On the other hand, when corresponding to the category 2, medical history information previously agreed by the driver is additionally transmitted to the server. In order to implement this, when the driver receives the vehicle or subscribes to the vehicle-related service (e.g., Bluelink service), the driver inputs health information to be delivered in the event of an emergency, and the server manages it. Thus, when the vehicle transmits emergency detection information to the server, the server may extract health information of a matched driver managed by a database or the like, and then use it when making a rescue request to other vehicles. Accordingly, there is a technical effect of quickly establishing a more optimized structure.

And, when corresponding to the category 3, for example, vehicle state information is additionally transmitted to the server.

Figure 5:
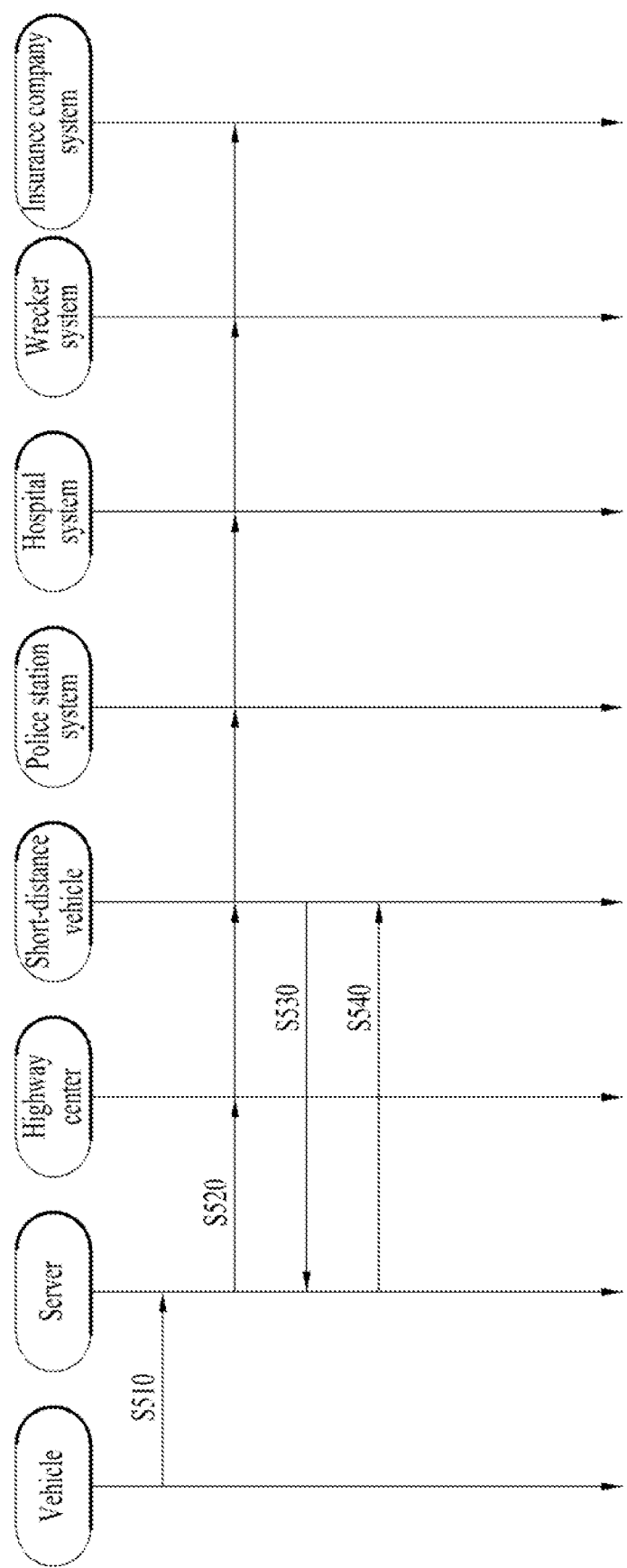
FIG. 5 is a flowchart to describe a system of selectively transmitting emergency related information depending on a priority according to one of embodiments of the present disclosure.

FIG. 5 is a flowchart to describe a system of selectively transmitting emergency related information depending on a priority according to one of embodiments of the present disclosure.

In FIG. 4, a method of grouping driver's states and vehicle states into a plurality of categories (categories 1 to 3) according to them has been described. Hereinafter, a system for selectively transmitting emergency related information according to a priority will be described with reference to FIG. 5.

A vehicle according to one embodiment of the present disclosure transmits information related to an accident and the like to a server [S510]. Here, the information related to the accident and the like includes, for example, information on driver's medical history, reward information to be paid for rescue, image information around an accident vehicle, location information, vehicle state information (e.g., failure, presence or non-presence of accident impact, etc.) and the like.

Furthermore, the server (e.g., it may be Bluelink, a UVO center, etc.) is designed to selectively transmit emergency related information to each subject in order to improve the efficiency of data transmission without transmitting the same information described above to a highway center, a short-distance vehicle, a police station system, a hospital system, and an insurance company system [S520]. For example, information about car failures or accidents may be transmitted to the short-distance vehicle, the police station system, the wrecker system and the like, but not to the hospital system. Furthermore, driver's medical history information and the like are designed to be transmitted only to the short-distance vehicle, the hospital system, and the insurance company system.

In particular, according to the present disclosure, information necessary for rescue of a target vehicle and a driver, rescue reward-related information, and driver's medical history information are additionally transmitted to the short-distance vehicle, thereby providing a system that enables an ordinary person or a healthcare professional to perform a rescue more quickly.

The server receives a response message accepting the rescue from a specific short-distance vehicle among a plurality of short-distance vehicles [S530]. When the rescue action is completed, the server transmits reward-related information to the corresponding short-distance vehicle [S540]. An embodiment related to this will be described in more detail with reference to FIG. 6 as follows.

Figure 6:
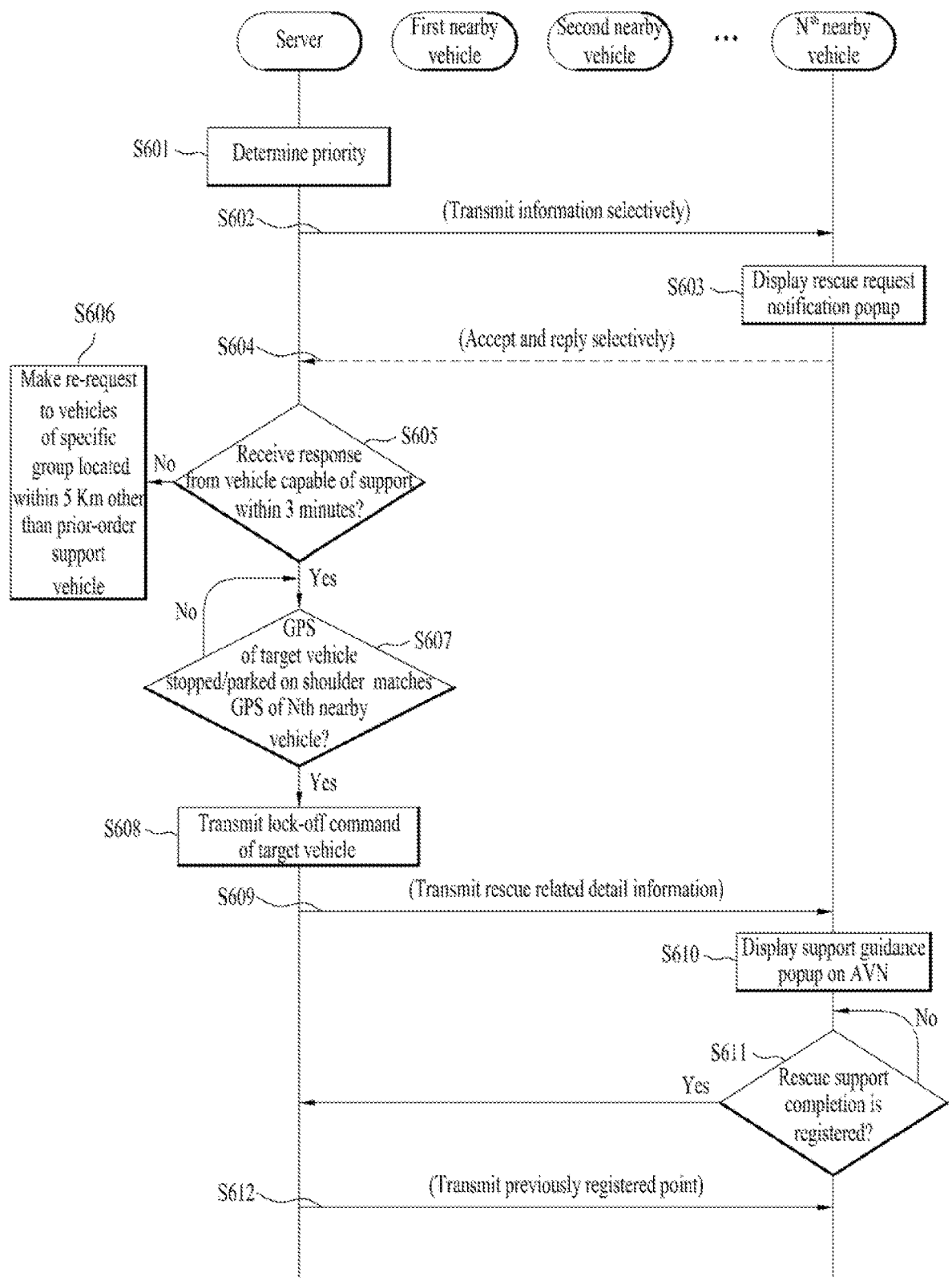
FIG. 6 is a flowchart illustrating a process for executing emergency relief by a specific nearby vehicle according to one of embodiments of the present disclosure.

FIG. 6 is a flowchart illustrating a process for executing emergency relief by a specific nearby vehicle according to one of embodiments of the present disclosure.

According to one embodiment of the present disclosure, a server determines priorities for vehicles determined to be highly likely to rescue a rescue-required vehicle [S601].

For example, a vehicle with volunteer support, a medical person's vehicle, a police vehicle, a vehicle with paramedics on board, a vehicle within 10 km from an accident target vehicle, a vehicle of an engineer capable of repairing a vehicle failure, and a vehicle with an emergency first-aid kit are determined as prior-order support vehicles.

Subsequently, the server transmit information to the prior-order support vehicle preferentially/selectively [S602].

As shown in FIG. 6, it is assumed that a rescue request notification popup is displayed on an N$^{th}$ nearby vehicle [S603]. More specifically, the notification popup may be output through, for example, a Head Up Display (HUD), an AVN, an application of a mobile phone, a cluster, or the like. The notification popup includes, for example, a location of a rescue vehicle stopped/parked on a shoulder of a highway, a current situation of the rescue vehicle, a Surround View Monitor (SVM) image, a current driver state information, reward case details for successful rescue support, rescue request details, etc.

In this case, the Nth nearby vehicle makes a reply that selectively accepts a rescue support available area (e.g., emergency treatment of a particular part, artificial respiration, etc.) through an application of a mobile phone [S604].

Meanwhile, the server determines whether to receive a response from the N$^{th}$ nearby vehicle that is the vehicle capable of support within 3 minutes for example [S605].

When there is no reception within 3 minutes as a result of the determination [S605], the server retransmits the rescue request to the vehicles of the specific group located within 5 km of the above-described prior-order support vehicle [S606]. Here, the vehicles of the specific group refer to vehicles of which drivers have previously agreed to aid support (e.g., when purchasing a vehicle, when subscribing to Bluelink after purchasing, etc.).

When there is a reception within three minutes as a result of the determination [S605], the server determines whether the GPS of the target vehicle stopped/parked on the shoulder matches the GPS of the N$^{th}$ vehicle applying for the rescue [S607]. Yet, although the GPS information fails to match exactly, for example, if the GPS informations of two vehicles are within 10 m and both of the vehicles stopped/parked, the GPS informations are regarded as matching each other, which comes within the scope of the present disclosure as well.

As a result of the determination [S607], when the GPS of the target vehicle stopped/parked on the shoulder matches the GPS of the N$^{th}$ nearby vehicle having applied for the rescue, the server transmits a lock-off command for changing at least one door of the target vehicle to an open state to the target vehicle [S608].

Meanwhile, the server additionally transmits detailed structure-related information to the N$^{th}$ nearby vehicle arriving at the site [S609], and the N$^{th}$ nearby vehicle having received it displays support guidance related information as a popup on the AVN [S610]. Here, the message displayed in the step S610 may include a manual described in advance by the driver of the target vehicle regarding a countermeasure in case of an emergency, or a general guide suitable for a rescue situation.

In addition, it is determined whether a rescue supporter who arrives at the site has completed all rescue support activities [S611]. For example, it may be performed by an RFID tag system of a mobile phone of a rescue requestor or a rescue request vehicle and a mobile phone of the rescue supporter.

The corresponding tagging information is transmitted to the server again, and the server transmits a pre-registered point directly to the N$^{th}$ nearby vehicle or to a mobile phone of the corresponding vehicle owner [S612]. Thus, voluntary rescue support is activated, and there is a high possibility that a particular group of adjacent drivers (e.g., medical personnel, vehicle repair engineers, etc.) will arrive at the site quickly.

Specifically, for example, the rescue vehicle approaches the rescue request vehicle and then performs the rescue support. After that, it is a new system that may tag a mobile phone of the rescue supporter to a vehicle or mobile phone of the rescue requester and receive a first reward (point accumulation). In addition, the first reward (e.g., 50% of the reward preset by the driver) may be made with tagging only, and a second reward (e.g., 100% of the reward preset by the driver) may be completed with the authentication of the rescue requester when a complete rescue is completed (e.g., when consciousness of an unconscious driver is detected by a camera attached to the vehicle).

Meanwhile, the present disclosure may also be implemented in the form of a recording medium that stores the embodiments mentioned in the present specification. For example, a computer-readable recording medium is designed to store a first command for determining whether a vehicle has entered a shoulder based on Global Positioning System (GPS) information, a second command for controlling at least one Light Emitting Diode (LED) projector based on an external information of the vehicle and a first internal information of the vehicle when the vehicle is determined as having entered the shoulder, and a third command for transmitting a second internal information different from the first internal command to a server when the vehicle is determined as having entered the shoulder.

Figure 7:
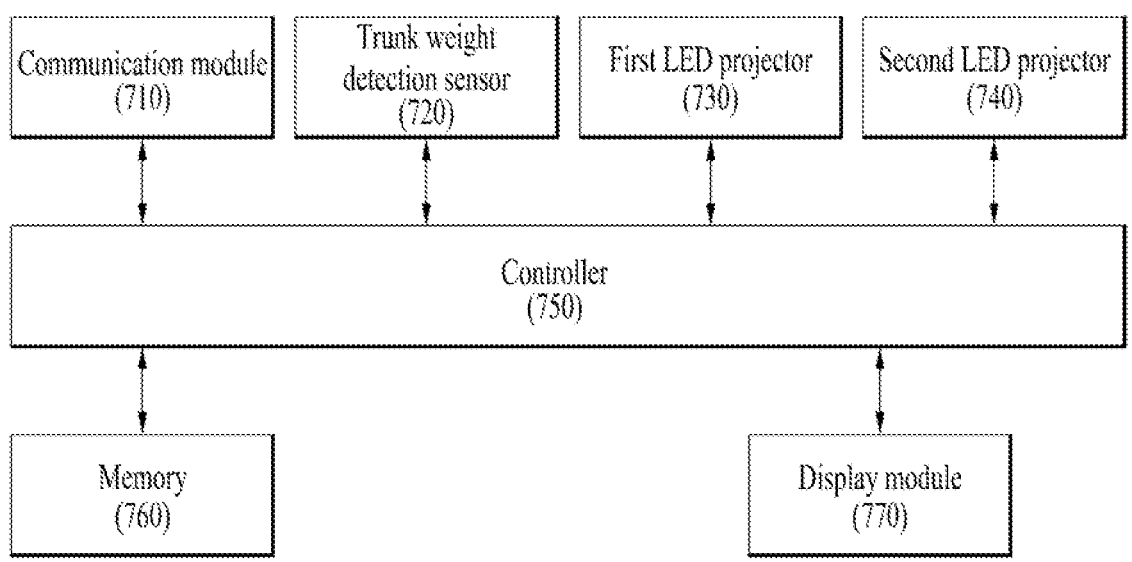
FIG. 7 is a block diagram showing in-vehicle components to redundantly protect a driver according to one of embodiments of the present disclosure.

FIG. 7 is a block diagram showing in-vehicle components to redundantly protect a driver according to one of embodiments of the present disclosure. FIG. 7 may be supplementarily construed by those skilled in the art with based on FIGS. 1 to 6.

A vehicle 700 according to one embodiment of the present disclosure includes a communication module 710, a trunk weight detection sensor 720, a first LED projector 730, a second LED projector 740, a controller 750, a memory 760, a display module 770, etc. Of course, it is possible to delete, add, or change some components in accordance with the needs of those skilled in the art, and the scope of the present disclosure should be determined in accordance with the matters described in the claims.

The controller 750 determines whether the vehicle 700 has entered the shoulder based on Global Positioning System (GPS) information. The GPS information is received through, for example, the communication module 710.

When the controller 750 determines that the vehicle 700 has entered the shoulder, the first LED projector 730 or the second LED projector 740 is designed to display a virtual warning triangle on the ground based on external information (e.g., braking distance information of another vehicle, visual information, weather information, information related to sunset/sunrise, etc.) of the vehicle 700 and a first internal information (e.g., determining whether an object is loaded in a trunk using the trunk weight detection sensor 720) of the vehicle 700.

When the controller 750 determines that the vehicle 700 has entered the shoulder, the communication module 710 is designed to transmit a second internal information different from the first internal information to the server. Here, the second internal information may include driver's state information, vehicle's state information, etc.

When GPS information corresponding to the location of the vehicle 700 is within an error range with GPS information of a preset shoulder, the controller 750 primarily estimates that the vehicle has entered the shoulder.

If the GPS information corresponding to the location of the vehicle 700 is out of the error range with the GPS information of the preset shoulder, the controller 750 secondarily estimates that the vehicle 700 has entered the shoulder only when the vehicle 700 is located on the highway and the stoppage/parking time is at least 3 seconds continuously.

The controller 750 is designed to activate the first LED projector 730 installed outside the rear surface of the vehicle 700 when a first condition stored in the memory 760 is satisfied. In this regard, it has been described above in FIG. 3 (*a*).

When a second condition stored in the memory 760 is satisfied, the controller 750 calculates the weight of an object loaded in the trunk of the vehicle 700 by the weight detection sensor 720. When the calculated weight of the object is zero, the controller 750 opens the trunk of the vehicle 700 and activates the second LED projector 740 installed inside the vehicle. In this regard, it has been described above in FIG. 3 (*b*).

When the second internal information corresponds to Category 1, the communication module 710 receives unique identification information on an emergency vehicle from the server, and the controller 750 controls at least one door of the vehicle to be in an openable state only when the unique identification information on the emergency vehicle is recognized within a preset distance.

When the second internal information corresponds to Category 2, the communication module 710 receives map information on a hospital within a preset distance from the vehicle 700 from the server, and the controller 750 controls the display module 77 to display the received map information.

According to embodiments of the present disclosure, a dangerous situation of a driver and a vehicle, which may occur when stopping/parking on a shoulder of a highway, is transmitted to a server automatically/manually through a function of a Driver State Warning (DSW) system, an infotainment function of an AVN and the like, and a V2X function, etc., thereby providing a technical effect of improving safety of all drivers within a highway.

In another aspect of the present disclosure, the above-described proposal or operation of the present disclosure may be provided as codes that may be implemented, embodied or executed by a "computer" (System on Chip (SoC)), an application storing or containing the codes, a computer-readable storage medium, a computer program product, and the like, which also comes within the scope of the present disclosure.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of controlling a vehicle to redundantly protect a driver, the method comprising:
    determining whether the vehicle has entered a shoulder of a road based on a Global Positioning System (GPS) information;
    based on a result of the determining, controlling a Light Emitting Diode (LED) projector to display a warning signal on a surface behind the vehicle based on a first internal information of the vehicle, and transmitting a second internal information different from the first internal information to a server; and
    receiving, when the second internal information corresponds to a first category, a unique identification information on an emergency vehicle from the server.

2. The method of claim 1, wherein the result of the determining is that the vehicle entered the shoulder.

3. The method of claim 1, wherein the determining further comprises estimating that the vehicle has entered the shoulder when a location GPS information of the GPS information is within an error range of a preset shoulder GPS information of the GPS information.

4. The method of claim 3, wherein the determining further comprises estimating, when the location GPS information is out of the error range of the preset shoulder GPS information, that the vehicle has entered the shoulder when the vehicle is located on a highway and a stoppage/parking time is continuously equal to or greater than at least 3 seconds.

5. The method of claim 1, wherein the controlling further comprises activating, when a first condition is satisfied, a first LED projector installed outside a rear surface of the vehicle.

6. The method of claim 5, wherein the controlling further comprises calculating, when a second condition is satisfied, a weight of an object loaded in a trunk of the vehicle using a weight detection sensor.

7. The method of claim 6, the controlling further comprising:
    opening the trunk of the vehicle when the calculated weight of the object is zero; and
    activating a second LED projector installed inside the vehicle.

8. The method of claim 1, further comprising:
    controlling at least one door of the vehicle to be in an openable state when the unique identification information is recognized within a preset distance.

9. The method of claim 8, further comprising:
    receiving from the server, when the second internal information corresponds to a second category, a map information on a hospital within a preset distance from the vehicle; and
    displaying the received map information.

10. The method of claim 9, wherein when the second internal information corresponds to a third category, the second internal information comprises a Diagnostic Trouble Code (DTC).

11. An apparatus, comprising:
    one or more processors configured to execute instructions; and
    a memory storing the instructions, wherein execution of the instructions configures the one or more processors to:
        determine whether a vehicle has entered a shoulder of a road based on a Global Positioning System (GPS) information;
        control, when the vehicle is determined as having entered the shoulder, a Light Emitting Diode (LED) projector based on a first internal information of the vehicle to display a warning signal on a surface behind the vehicle;

transmit, when the vehicle is determined as having entered the shoulder, a second internal information different from the first internal information to a server; and receive, when the second internal information corresponds to a first category, a unique identification information on an emergency vehicle from the server.

12. A vehicle redundantly protecting a driver, the vehicle comprising:
- a controller configured to determine whether the vehicle has entered a shoulder of a road based on a Global Positioning System (GPS) information;
- a Light Emitting Diode (LED) projector configured to display a warning signal on a surface behind the vehicle responsive to a first internal information of the vehicle based on a result of the determination; and
- a communication module configured to transmit a second internal information, different from the first internal information, to a server based on the result of the determination, and, when the second internal information corresponds to a first category, to receive a unique identification information on an emergency vehicle from the server.

13. The vehicle of claim 12, wherein the controller is further configured to estimate that the vehicle has entered the shoulder when a location GPS information of the GPS information is within an error range with a preset shoulder GPS information of the GPS information.

14. The vehicle of claim 13, wherein the controller is further configured to estimate, when the location GPS information is out of the error range with the preset shoulder GPS information, that the vehicle has entered the shoulder when the vehicle is located on a highway and a stoppage/parking time is continuously equal to or greater than at least 3 seconds.

15. The vehicle of claim 12, wherein the controller is further configured to activate, when a first condition is satisfied, a first LED projector installed outside a rear surface of the vehicle.

16. The vehicle of claim 15, wherein the controller is further configured to calculate, when a second condition is satisfied, a weight of an object loaded in a trunk of the vehicle using a weight detection sensor.

17. The vehicle of claim 12, wherein when the calculated weight of the object is zero, the controller is further configured to open the trunk of the vehicle and activate a second LED projector installed inside the vehicle.

18. The vehicle of claim 12, wherein when the second internal information corresponds to the first category, the communication module is further configured to control a door of the vehicle to be in an openable state when the unique identification information on the emergency vehicle is recognized within a preset distance.

19. The vehicle of claim 18, wherein when the second internal information corresponds to a second category, the communication module is further configured to receive a map information on a hospital within a preset distance of the vehicle from the server, and control a display module to display the received map information.

20. The vehicle of claim 12, wherein the result of the determination is that the vehicle entered the shoulder.

* * * * *